United States Patent

[11] 3,600,858

| [72] | Inventor | Charles L. Savell<br>Warren, Mich. |
|---|---|---|
| [21] | Appl. No. | 875,132 |
| [22] | Filed | Nov. 10, 1969 |
| [45] | Patented | Aug. 24, 1971 |
| [73] | Assignee | Ford Motor Company<br>Dearborn, Mich. |

[54] WEATHERSTRIP ASSEMBLY
4 Claims, 2 Drawing Figs.

[52] U.S. Cl. ................................................ 49/488,
49/498
[51] Int. Cl. .................................................. E06b 7/23
[50] Field of Search ........................................ 49/489,
475, 440, 441, 493, 498

[56] References Cited
UNITED STATES PATENTS
2,718,912  9/1955  Zimmerman ............... 160/368 S X

| 2,737,412 | 3/1956 | Smith et al. .................. | 49/493 |
| 2,759,760 | 8/1956 | Omlie ........................... | 49/489 X |
| 3,461,610 | 8/1969 | Peters et al. .................. | 49/493 X |

Primary Examiner—David J. Williamowsky
Assistant Examiner—Philip C. Kannan
Attorneys—John R. Faulkner and E. Dennis O'Connor ABSTRACT: A weatherstrip assembly for a vehicle body rail section defining an edge of a body window opening. A resiliently deformable weatherstrip is secured to the rail section and has a groove formed therein adapted to receive an edge of an unframed window panel. A rigid clip is secured to the rail section, extends about the outboard profile of the weatherstrip and projects into the weatherstrip groove where it bears against the outboard surface of the window panel and prevents window panel outboard movement.

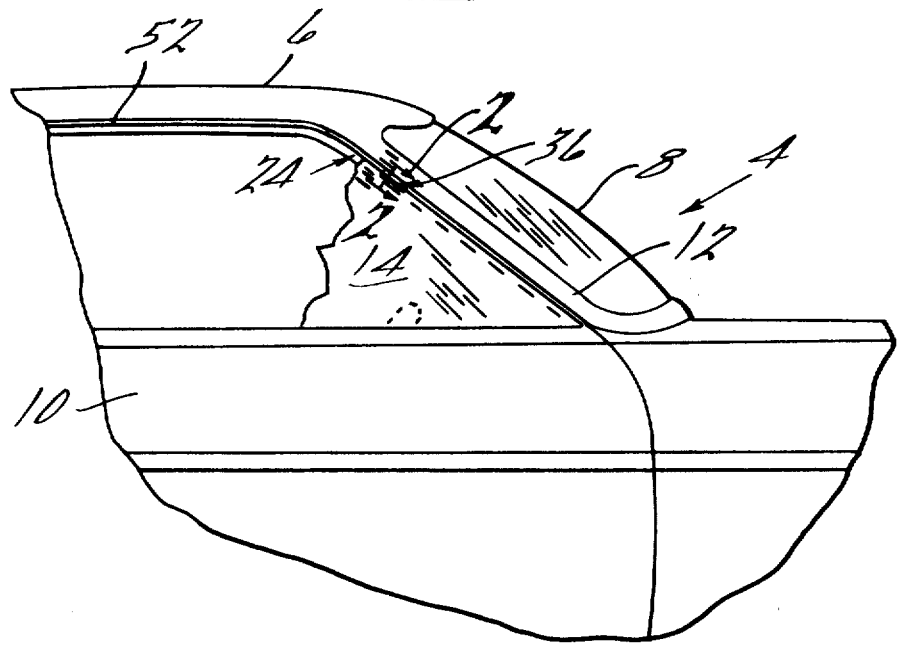

WEATHERSTRIP ASSEMBLY

BACKGROUND OF THE INVENTION

It is well known that in order to minimize the undesirable and annoying phenomenon known as "wind noise" which may occur at high vehicle operating speeds, a seal must be maintained about the periphery of a vehicle window panel. This is because a great deal of "wind noise" heard during high-speed vehicle operation actually is caused by relatively high-pressure air from the vehicle passenger compartment passing around the edge of the window panel and into the relatively low-pressure area proximate the outer skin of the moving vehicle.

Maintaining a seal around the three exposed edges of a vehicle window panel has been rendered more difficult on modern vehicles having no vent windows as such vehicles have no track or frame support whatever for the door window panel. Even though conventional weatherstrips are used to establish a seal about the window periphery, which seal is sufficiently strong to be maintained during high-speed operation, such a seal will be broken upon pressurization of the vehicle passenger compartment. Pressurization normally occurs during the operation of the vehicle climate control system when conditioned air is force fed into the passenger compartment by fan means. The relatively high pressure then acting on the inboard surface of the window panel causes the unframed and unsupported panel to move outwardly. This outward movement causes the destruction of the seal about the window panel periphery.

It is an object of this invention to provide a weatherstrip assembly for a motor vehicle body structure capable of making and maintaining an airtight seal about the periphery of an unframed window panel during all vehicle operation conditions. In order to accomplish this end, the weatherstrip assembly of this invention positively supports the window panel and prevents outboard movement thereof.

SUMMARY OF THE INVENTION

A weatherstrip assembly constructed in accordance with this invention is adapted for inclusion on a motor vehicle having body structure including a body pillar having a lower section to which a vehicle door is hinged and an upper section defining one side of a window opening. The vehicle door has a window panel movable between raised and lowered positions relative to the window opening. The weatherstrip assembly includes a resiliently deformable weatherstrip formed with a longitudinally extending groove therein and having a base secured to a longitudinal surface of the upper body pillar section. A marginal portion of the window panel in raised position of the latter is partially received in the groove and deforms the weatherstrip to form a compression seal between the window panel and the upper body pillar section. A clip formed from rigid material has its base portion secured to a surface of the upper body pillar section. The clip has a curved leg portion that extends from the base portion around the outboard profile of the weatherstrip and partially projects into the groove formed in the weatherstrip. The curved leg portion is positioned to guide the marginal portion of the window panel in raised position of the latter into the weatherstrip groove as the vehicle door swings about its hinges into a closed position. When the marginal portion of the window panel is inboard of the clip, the tip of its curved leg portion is effective to hold the window panel against movement away from the weatherstrip in a direction normal to the plane of the window opening. Thus, outboard movement of the panel is inhibited even if the pressure within the passenger compartment exceeds the pressure on the outboard surface of the window panel.

DESCRIPTION OF THE DRAWING

FIG. 1 is a partial side elevation view of a motor vehicle including a weatherstrip assembly constructed in accordance with this invention; and FIG. 2 is a partial sectional view taken along the line 2—2 of FIG. 1.

DETAILED DESCRIPTION OF THE INVENTION

Referring now in detail to the drawing, the numeral 4 denotes generally a motor vehicle including a weatherstrip assembly constructed in accordance with this invention. The vehicle includes body structure such as roof 6, windshield 8, and door 10. Roof 6 is supported in part by an A-pillar 12 partially defining a window opening located above door 10 which is conventionally hinged to a body pillar section supporting the A-pillar 12.

A substantially planar, glass window panel 14 is movable vertically between this window opening and door 10 by means of a conventional window regulator located within door 10. Window panel 14 has an outboard surface 16, an inboard surface 18 and a forward or leading edge 20. Window panel 14, when in the raised position illustrated in FIG. 1, is not framed nor does this window panel move in channels. Window panel 14 thus is unsupported against possible lateral movement when in the raised position illustrated in FIG. 1.

The vehicle body structure described above partially defines a passenger compartment designated by the numeral 22 in FIG. 2. In order to establish a weathertight seal between passenger compartment 22 and the exterior of the vehicle 4, it is necessary to establish a weathertight seal around the periphery of window panel 14 when the window panel is in the raised position. In order to establish such a seal, a weatherstrip 24 formed from resiliently deformable material is secured, as by adhesive or other suitable means, to the A-piller 12.

Weatherstrip 24 includes a base portion 26 and inboard and outboard lips 28 and 30 respectively, extending from the base portions. The inboard and outboard lips define between them a groove 32. The inboard and outboard lips are interconnected by a groove fillet or bridge portion 34.

A rigid clip formed from material such as steel is designated by the numeral 36. This clip includes a generally flat base portion 38 positioned between a portion of the weatherstrip base 26 and the A-pillar 12. Insertion of clip base 28 beneath the weatherstrip base 26 is possible because an inboard portion of the weatherstrip base is cut away in part at 40 and an outboard portion of the weatherstrip base is cut away in part at 42, allowing the insertion of the clip base 38 beneath the weatherstrip base.

An arcuate clip portion 44 interconnects the clip base 38 and a hook-shaped projection 46 terminating remote from arcuate portion 44 in end 48. The projection 46 lies along the outboard surface of weatherstrip 24 and thus conforms in profile to the outboard lip 30. The hook projection 46 is coated with a synthetic material 50 such as plastic for purposes to be described below.

As may be seen in FIG. 2 of the drawing, weatherstrip 36 is positioned on the A-pillar 12 so when window panel 14 is in the raised position, the forward portion of the window panel is received within groove 32 with leading edge 20 of the window panel bearing against the bridge portion 34 and deforming the weatherstrip. This deformation provides for the formation of an airtight seal between the weatherstrip and the window panel.

Since hook-shaped projection 46 of clip 36 is positioned with end 48 projecting into groove 32, end 48 is in contact by the outboard surface 16 of window panel 14. The clip 36 thus acts as a locating member for the unsupported window panel 14.

It will be understood that as the vehicle door 10 is opened and closed with the window panel 14 in a raised position, the marginal portion of the window panel partially received within the groove 20 is able to move into and out of the groove since its edge is moving in an arcuate path as the door 10 swings about the hinge axis located below the A-pillar. The clip arcuate leg portion 46 is able to function as a guide insuring proper seating of the marginal edge of the window panel in the groove 20.

In the event that the vehicle passenger compartment becomes pressurized such as occurs during the operation of the vehicle climate control system fan, the pressure on inboard window panel surface 18 will exceed the pressure acting on outboard window panel surface 16, located in the low-pressure area proximate the outer skin of a moving vehicle. Outboard movement of the window panel 14 due to this pressure differential is prevented, however, by end 48 of the rigid clip 36 bearing on the outside surface 16 of the window panel. Destruction of the seal between the window panel 14 and weatherstrip 24, as well as other weatherstrips surrounding its periphery such as weatherstrip 52 positioned along the bottom portion of roof 6, thus is prevented.

Hook-shaped clip projection 46 is coated with a plastic 50 in order to prevent a possible rattle or other noise due to contact between the clip end 48 and the outer surface 16 of the window panel. Coating 50 is somewhat resilient to cushion vibrations between these elements during vehicle operation.

It thus may be seen that this invention provides a vehicle weatherstrip assembly that both establishes an airtight seal about a vehicle window closure and prohibits destruction of this seal during all conditions that occur during vehicle operation including the pressurization of the vehicle passenger compartment. Outboard movement of the window panel as may occur during pressurization of the vehicle passenger compartment, is eliminated due to a positive contact between the window panel and a rigid clip located outboard of the window panel.

I claim:

1. A weatherstrip assembly for a motor vehicle body structure including a body pillar having a lower section to which a vehicle door is hinged and an upper section defining one side of a window opening, the vehicle door having a window panel movable between raised and lowered position relative to the window opening, the weatherstrip assembly including a resiliently deformable weatherstrip formed with a longitudinally extending groove therein and having a base secured to a longitudinal surface of the upper body pillar section, a marginal portion of the window panel in raised position of the latter being partially received in the groove and deforming the weatherstrip to form a compression seal between the window panel and the upper body pillar section, and a clip formed from rigid material and having a base portion secured to the upper body pillar section, the clip having a curved leg portion extending from the base portion and projecting partially into the groove of the weatherstrip from the outboard side of the latter, the curved leg portion being positioned to guide the marginal portion of the window panel in raised position of the latter into the weatherstrip groove as the vehicle door swings about its hinges into a closed position and to hold the marginal portion when inboard of the clip, and thereby the window panel, against movement away from the weatherstrip in a direction normal to the plane of the window opening.

2. The weatherstrip assembly of claim 1 wherein:
the clip is formed of metal,
and at least the part of the curved leg portion contiguous to and projecting into the groove being coated with a nonmetallic material.

3. The weatherstrip assembly of claim 2 wherein:
the weatherstrip has a convex outboard profile,
the clip curved leg portion overlying and conforming to at least a portion of the profile between the clip base and the groove.

4. The weatherstrip assembly of claim 1 wherein:
the weatherstrip has a convex outboard profile,
the clip curved leg portion overlying and conforming to at least a portion of the profile between the clip base and the groove.